(12) United States Patent
Hernandez et al.

(10) Patent No.: US 6,807,990 B1
(45) Date of Patent: Oct. 26, 2004

(54) MOTORCYCLE AND AUTOMOBILE GAS TANK PAINT PROTECTOR

(76) Inventors: Dena Michelle Hernandez, 1875 Midvale Dr., Pomona, CA (US) 91768; Kenneth Wayne Hernandez, 1875 Midvale Dr., Pomona, CA (US) 91768; William Hayes, 2716 W. 184th St., Redondo Beach, CA (US) 90278; Paula Jane Hayes, 2716 W. 184th St., Redondo Beach, CA (US) 90278

( * ) Notice: Subject to any disclaimer, the term of this patent is extended or adjusted under 35 U.S.C. 154(b) by 0 days.

(21) Appl. No.: 10/694,268

(22) Filed: Oct. 27, 2003

(51) Int. Cl.[7] .............................. B65B 1/04; B60R 9/02
(52) U.S. Cl. ........................ 141/390; 141/86; 141/97; 280/770
(58) Field of Search ..................... 141/86, 97, 390; 150/166, 167; 280/770

(56) References Cited

U.S. PATENT DOCUMENTS

| | | | |
|---|---|---|---|
| 2,538,813 A | * 1/1951 | Wagner | ............ 141/390 |
| 2,659,523 A | 11/1953 | Comber | |
| 5,490,549 A | 2/1996 | Biette | |
| 5,506,040 A | * 4/1996 | Cordani | ............ 428/218 |
| 5,785,099 A | * 7/1998 | Kashani | ............ 141/86 |
| 5,884,380 A | 3/1999 | Thurm | |
| 6,463,966 B1 | * 10/2002 | Goodger | ............ 141/86 |
| 6,481,478 B2 | 11/2002 | Mueller | |

* cited by examiner

Primary Examiner—Timothy L. Maust
(74) Attorney, Agent, or Firm—Dena Hernandez; Kenneth Hernandez

(57) ABSTRACT

A motorcycle and automobile gas tank paint protector preferably includes two scratch-resistant fabric pieces, a water/gasoline-resistant inlay, an internal protective ring, and a fabricated gas tank screw-in connector with an attached outer ring to insert gas nozzle. A gas tank hole opening is formed through the fabric, a protective inlay and inner protective ring between the two said fabric pieces thereof. The fabric pieces and inlay are preferably attached to each other on the outer perimeters thereof and the perimeter of the gas opening with stitching or any other suitable method. The gas tank paint protector is assembled with the connector screw-in piece, placed in the gas tank opening such that the connector piece can be screwed in the opening of the gas tank, fill the gas tank and removed. The gas tank paint protector may be folded and stored by inserting into a well air-ventilated canister or pouch.

10 Claims, 3 Drawing Sheets

MOTORCYCLE AND AUTOMOBILE GAS TANK PAINT PROTECTOR

DISCUSSION OF THE PRIOR ART

It appears that no commercially available device exists for temporarily covering the top surface by means of a connecting piece to a motorcycle and/or automobile gas tank while filling thereof with gasoline. U.S. Pat. No. 6,481,478 to Mueller discloses a device which covers the opening of a motorcycle gas tank utilizing a gas tank opening in the device. U.S. Pat. No. 5,490,549 to Beitte discloses a device which covers the top and sides of a motorcycle gas tank. U.S. Pat. No. 5,884,830 to Thurm discloses a motorcycle gas tank cover for cosmetically altering the appearance of a motorcycle gas tank. U.S. Pat. No. 2,659,523 to Comber discloses a heavy nonfoldable protective bib used to cover an automobile fender.

BACKGROUND OF THE INVENTION

Field of the Invention

The present invention relates generally to motorcycle and automobile gas tanks, which prevents gasoline from damaging the finish on a motorcycle and automobile gas tank.

Accordingly, there is a clearly felt need in the art for a motorcycle and automobile gas tank paint protector which temporarily covers only a necessary portion of a motorcycle and automobile gas tank, may be folded for insertion into a well-ventilated canister, and may be easily attached to the motorcycle and automobile gas tank based on the design of the gas tank opening.

SUMMARY OF THE INVENTION

The present invention provides a motorcycle and automobile gas tank paint protector which may be easily attached to a gas tank and stored in a well-ventilated canister or well-ventilated pouch. The gas tank paint protector preferably includes two fabric pieces resembling a bandana-like appearance, a protective inlay, a connector ring, and a connector attachable to the gas tank. A gas opening is formed through the fabric pieces and protective inlay at one end thereof. The fabric pieces and protective inlay are preferably attached to each other on the outer perimeters thereof and the perimeter of the gas opening. The fabric pieces and protective inlay may be attached to each other with stitching, heat sealing, or any other suitable assembly method.

The gas tank paint protector is preferably used in the following manner. The gas cap is removed from the gas tank. The gas tank paint protector connector is inserted into the gas opening in the gas tank. The connector is screwed into the gas tank, whereby the protective ring is attached to provide a tight seal over the gas opening, the fabric pieces with the protective inlay is placed over the gas opening, the screw-in connector with protective ring is attached over the fabric pieces and protective inlay, thus protecting the paint surrounding the gas opening. The gas tank is filled with gas through the opening in the screw-in connector and the gas tank paint protector is removed by unscrewing the connector. The gas tank paint protector Is folded and inserted into the well-ventilated canister or well-ventilated pouch.

Accordingly, it is an object of the present invention to provide a gas tank paint protector which may be attached to a motorcycle and automobile gas tank without tools and with ease.

Finally, it is another object of the present invention to provide a gas tank paint protector which may be stored into a well-ventilated canister to be carried and stored on a motorcycle and automobile.

These and additional objects, advantages, features and benefits of the present invention will become apparent from the following specification.

DETAILED DESCRIPTION OF THE PREFERRED EMBODIMENTS

Figure 1:
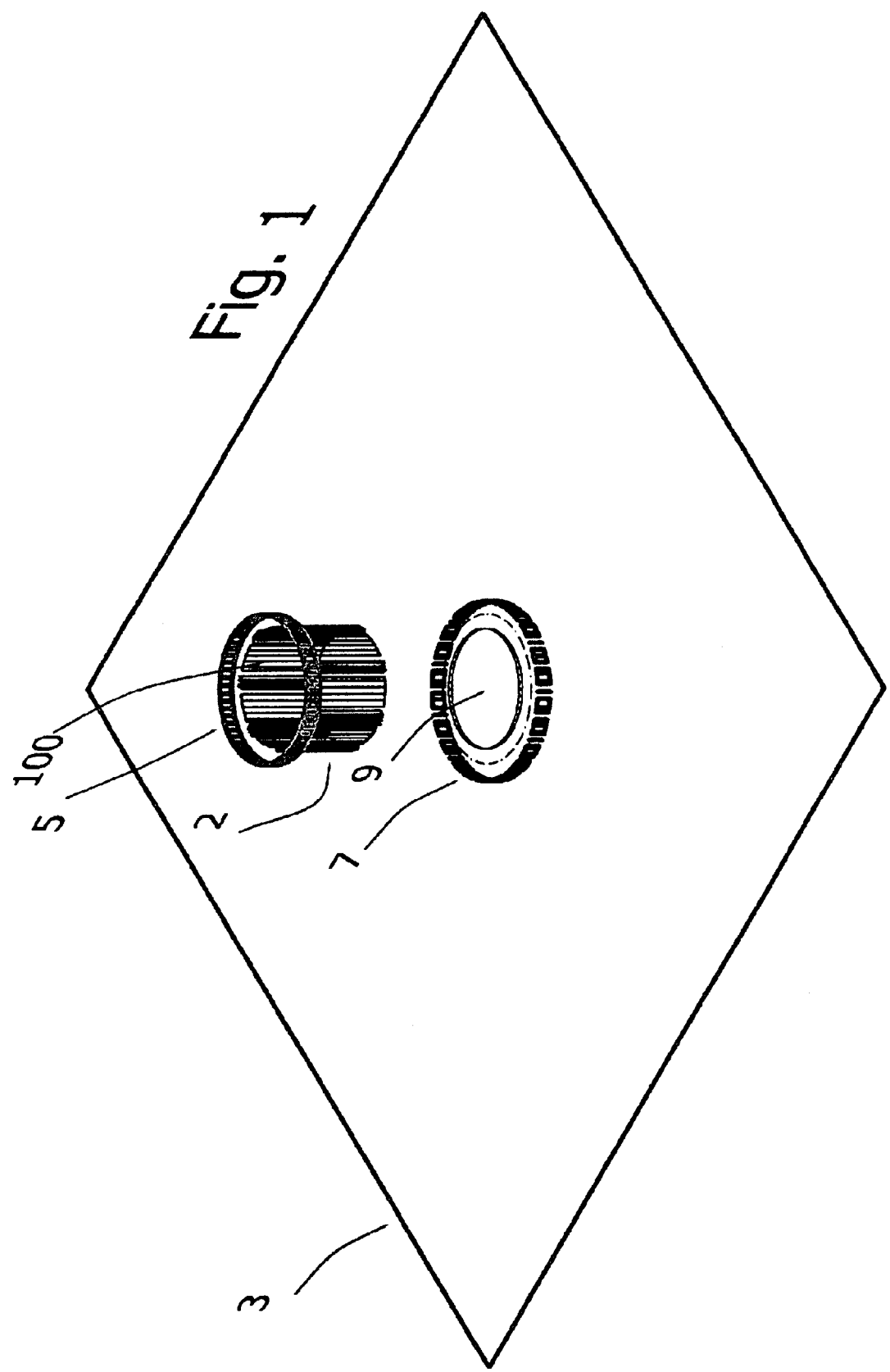
FIG. 1—is an exploded perspective view of a gas tank paint protector in accordance with the present invention.
Figure 2:
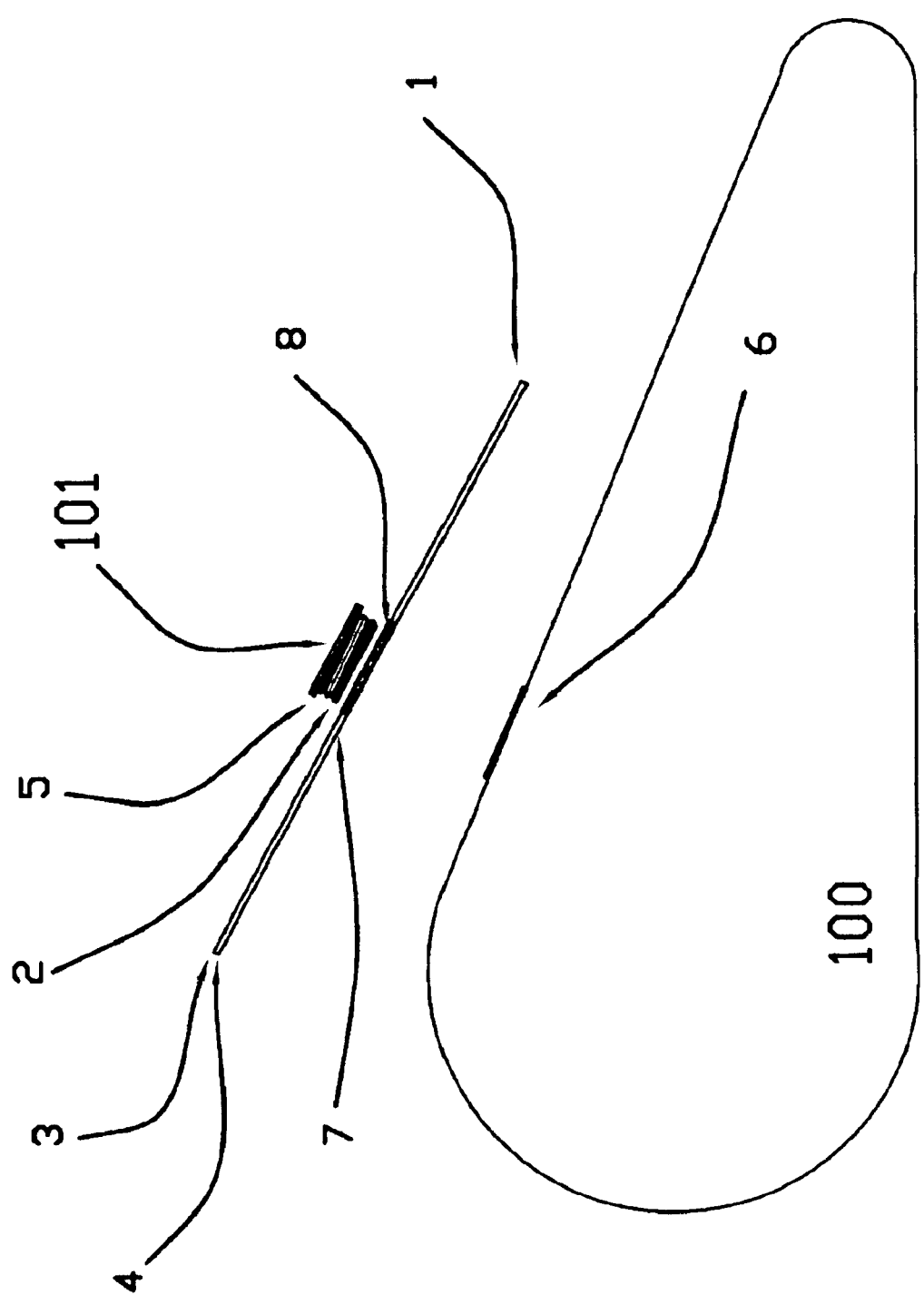
FIG. 2—is a side view of a motorcycle gas tank paint protector ready to be installed on a motorcycle gas tank in accordance with the present invention.
Figure 3:
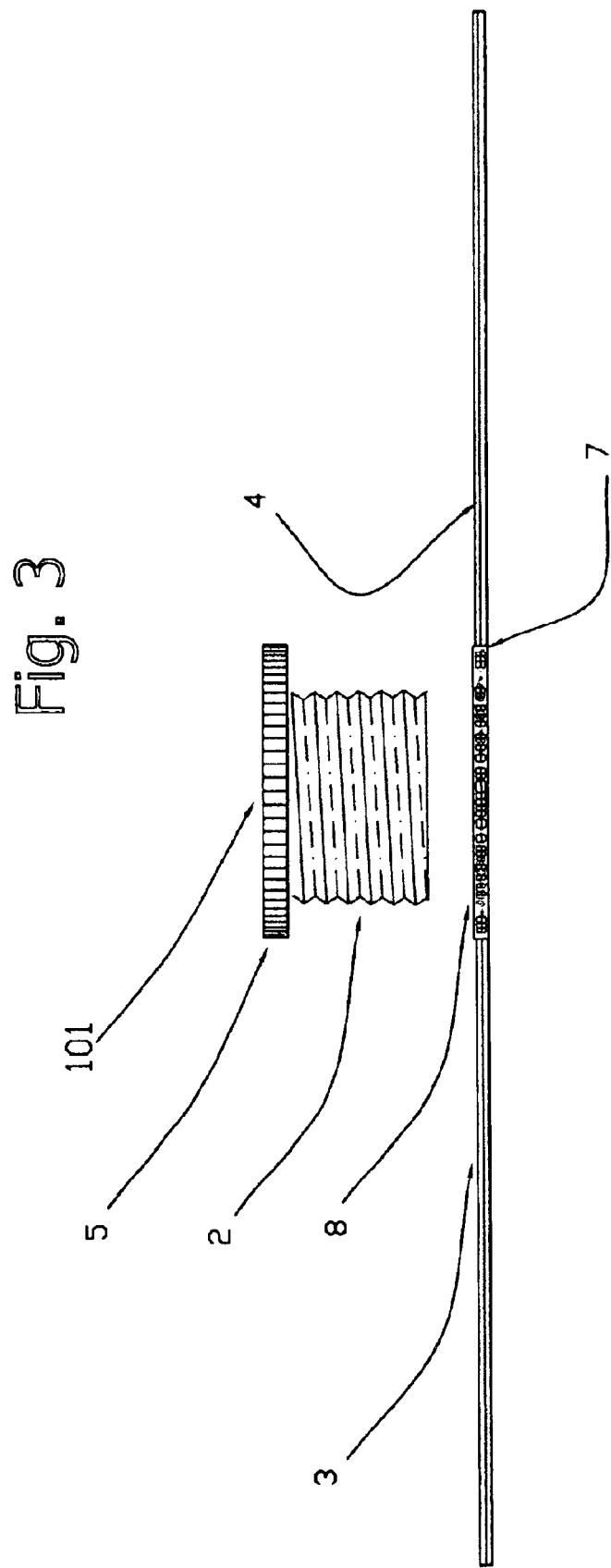
FIG. 3—is a side view of a gas tank paint protector in accordance with the present invention.

With reference now to the drawings, and particularly to FIG. 1, there is shown a perspective view of a gas tank paint protector 1. With reference to FIG. 2, the gas tank paint protector 1 includes an attachable connector 2, fabric pieces 3 with a protective inlay 4, and a fabricated protective ring 5 to provide a tight seal around the gas opening 6 on the gas tank. A gas opening 8 is formed through the fabric pieces 3 and the protective inlay 4 at one end thereof. The fabric pieces 3 and protective inlay 4 are preferably attached to each other on the outer perimeters thereof and on the perimeter of the gas opening 8. The outer perimeters of the pieces may have any suitable shape, but preferably the present invention calls for a bandana-like appearance for ample coverage of the paint surrounding the gas tank opening 6 The fabric pieces 3 and protective inlay 4 may be attached to each other with stitching, heat sealing, or any other suitable assembly method. The fabric pieces 3 are fabricated from a scratch-resistant material, which will not scratch paint or a protective coating. The protective inlay 4 and protective ring 5 is preferably fabricated from a material, which resists any liquid substance, preferably gasoline. Both the fabric pieces 3 and protective inlay 4 must be fabricated from a material which does not react with gasoline or damaged thereby.

The screw-in connector 2 is preferably a screw-in type design fabricated from a material having an inner perimeter, which is the same as the gas tank opening 6 The connector 2 and protective ring 5 are preferably fabricated from a thin material which does not react with gasoline or damaged thereby.

The gas tank paint protector 1 is preferably used in the following manner. The gas tank cap is removed from the gas tank 100. The gas tank paint protector 1 is placed over the gas tank 100 such that the gas opening 8 aligns with the gas spout in the gas tank 100. The connector 2 is inserted into the gas tank 100, and screwed into place. The connector 2 is screwed into the gas tank, whereby the protective ring 5 is attached to provide a tight seal over the gas tank opening 6, the fabric pieces 3 with the protective inlay 4 is placed over the gas opening 8, and the connector 2 is over the fabric pieces 3 and protective inlay 4, thus protecting the paint surrounding the gas opening 6. The gas tank is filled with gas through the top opening 101 and the gas tank paint protector 1 is removed by unscrewing the connector 2. The gas tank paint protector 1 is folded and inserted into the well-ventilated canister or well-ventilated pouch for storage.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A gas tank paint protector capable of being attached to a gas tank comprising:
   i. two (2) layers of scratch-resistant fabric pieces;
   ii. a water/gasoline-resistant inlay;
   iii. a protective inner ring;
   iv. said fabric pieces being attached to each other, a gas opening being formed through said fabric pieces, said gas opening being sized to fully protect the paint surrounding a gas spout in the gas tank; and
   v. an attachable connector with protective ring being a screw-in piece, which is assembled with the fabric pieces having an inner perimeter which is equal to that of the gas opening, which the connector is disposed inside said gas opening.

2. The gas tank paint protector capable of being attached to a gas tank of claim 1, wherein:
   i. said fabric pieces are being attached to a protective inlay on an outer perimeter thereof with stitching and attached to a protective inlay and protective ring on a perimeter of gas opening by heat sealing.

3. The gas tank paint protector capable of being attached to a gas tank of claim 2, wherein:
   i. said fabric pieces are fabricated of such fabric conducive of not scratching or abrading paint or a protective coating on a gas tank.

4. The gas tank paint protector capable of being attached to a gas tank of claim 1, wherein:
   i. said protective inlay and protective ring being fabricated from a material which will not react with gasoline or be damaged thereby.

5. The gas tank paint protector capable of being attached to a gas tank of claim 1, wherein:
   i. a protective inlay material placed in between the two (2) fabric pieces having a gas opening formed through thereof, said gas opening being sized to fully protect the paint surrounding a gas spout in the gas tank.

6. The gas tank paint protector capable of being attached to a gas tank of claim 5, wherein:
   i. said protective inlay material and protective ring not reacting with gasoline or being damaged thereby.

7. The gas tank paint protector capable of being attached to a gas tank of claim 1 wherein:
   i. said gas tank paint protector capable of being folded for insertion into a well-ventilated canister or well-ventilated pouch.

8. A gas tank paint protector capable of being attached to a gas tank comprising:
   i. a screw-in connector having a protective internally attached ring of said fabric pieces surrounding the gas opening being sized to fully protect the paint surrounding a gas spout on the gas tank;
   ii. said gas tank paint protector capable of being folded for insertion into a well-ventilated canister or well-ventilated pouch;
   iii. said screw-in connector having an inner perimeter which is equal to that of said gas opening; and
   iv. said connector being disposed inside said gas opening.

9. The gas tank paint protector capable of being attached to a gas tank of claim 8, wherein:
   i. a screw-in connector being inserted into opening of gas tank by the use of edges providing such use.

10. The gas tank paint protector capable of being attached to a gas tank of claim 9, wherein:
   i. said fabric piece surface not scratching or abrading paint or a protective coating on a gas tank.

\* \* \* \* \*